Figure 1:
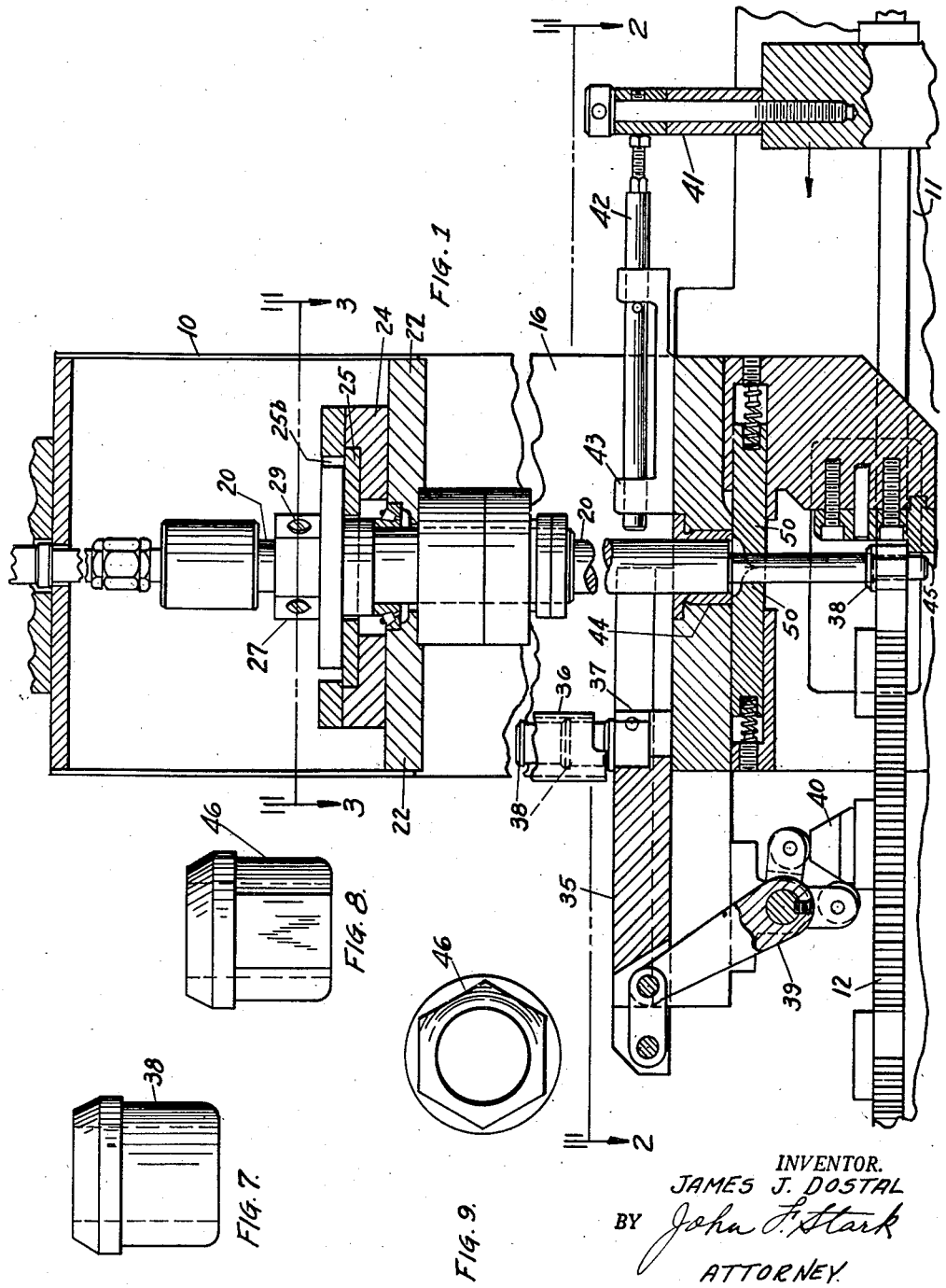

April 3, 1945.  J. J. DOSTAL  2,372,818
MACHINE TOOL
Filed Nov. 16, 1942  3 Sheets-Sheet 3

INVENTOR.
JAMES J. DOSTAL.
BY John F. Stark
ATTORNEY

Patented Apr. 3, 1945

2,372,818

UNITED STATES PATENT OFFICE 2,372,818

MACHINE TOOL

James J. Dostal, Detroit, Mich., assignor to Eaton Manufacturing Company, Cleveland, Ohio, a corporation of Ohio Application November 16, 1942, Serial No. 465,653

3 Claims. (Cl. 90—33)

This invention relates to machine tools in general, and, more particularly, to a machine tool incorporating an indexing apparatus especially adaptable for performing two or more related operations on a work piece.

Among the objects of the present invention is the provision of a machine tool having spaced teeth on the tool means and including indexing and positioning apparatus for disposing a work piece in timed relation down between the tool means; the provision in a machine tool as described, of a plurality of sets of tools with longitudinal spacing between each set thereof to enable indexing of the work therebetween; the provision in a machine tool as described of powered broaching tools comprising longitudinally spaced sets of cutting teeth including indexing and positioning means for variably disposing a work piece with respect to the tools during intermediate stages of completion thereof, and including work stripping means operable in timed relation to initiating return travel of the tools; and the provision in a machine tool as described above including indexing apparatus for variably positioning the work with respect to the tools without altering or effecting the travel of the tools to enable secondary operations to be performed on the work.

More particularly, an especial object of the present invention is the provision on a broaching machine of an indexing apparatus adapted to position a work piece thereof in a number of positions to perform consecutive operations thereon, such as the hexagonal broaching of a nut.

Further and other objects and advantages of the present invention reside in the novel combination and arrangement of parts about to be described, when considered in conjunction with the drawings, forming a part of this specification, and which are more particularly pointed out in the appended claims.

Figure 2:
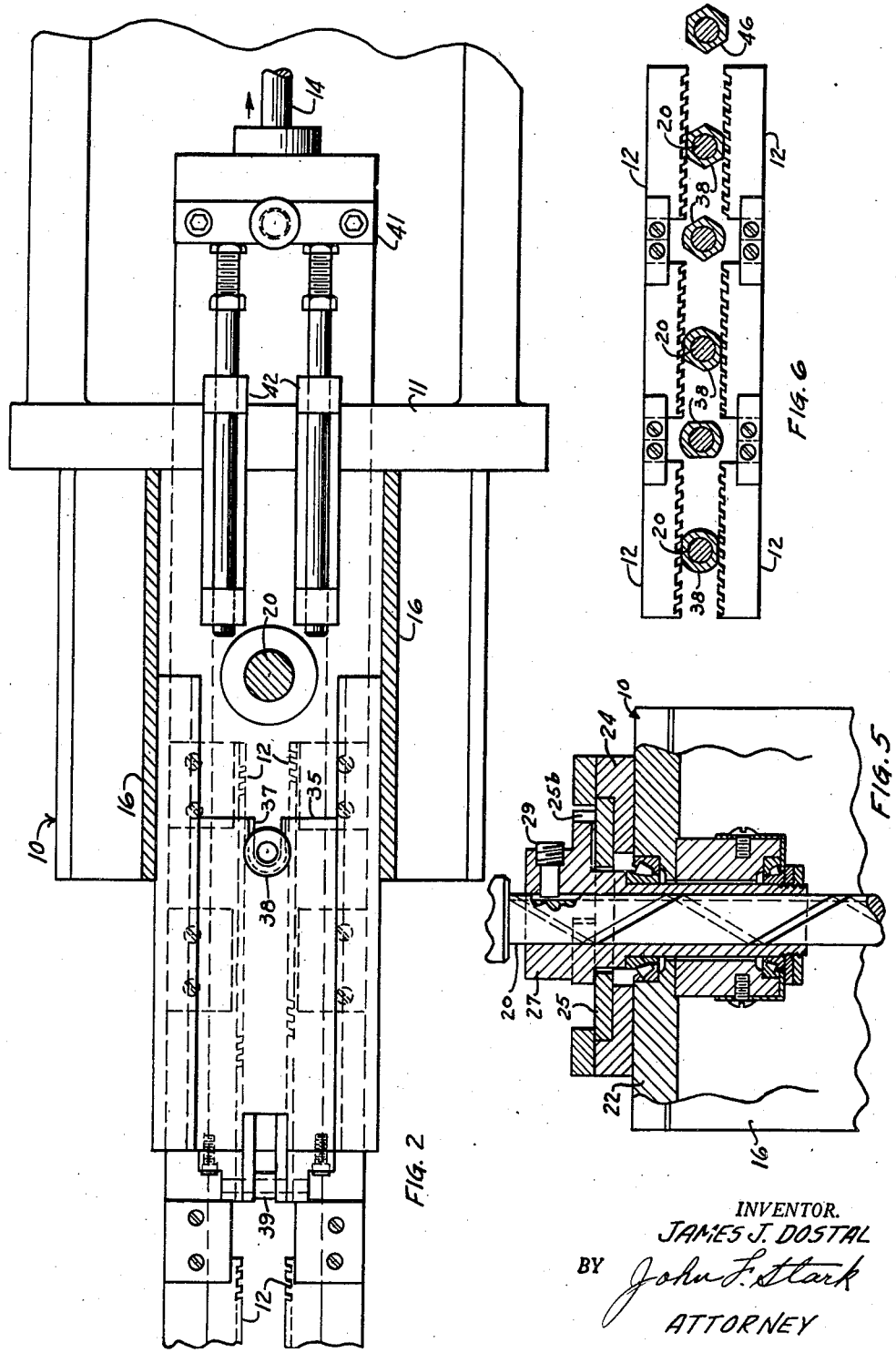
Figure 3:
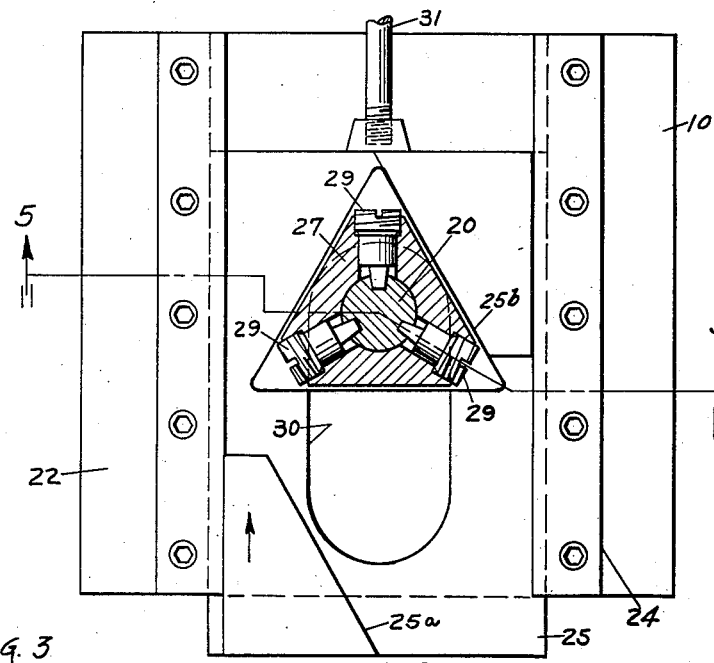
Figure 4:
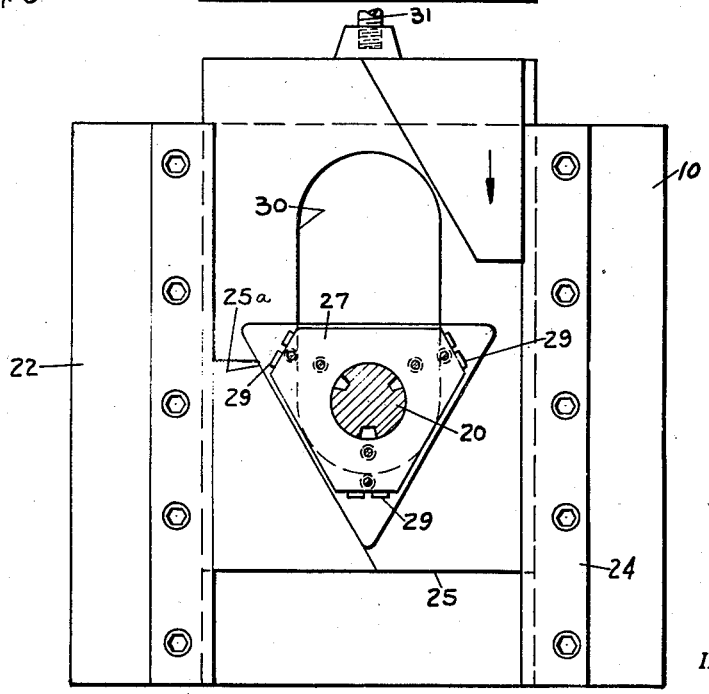

In the drawings like reference characters denote corresponding parts in the several views, and in which:

Fig. 1 illustrates a side elevational view of a machine table, with portions broken away to reveal details thereof, embodying indexing apparatus for a work piece thereof according to the teaching of this invention; and Fig. 2 is a top plan view of the apparatus shown in Fig. 1, taken substantially on the line 2—2 thereof; and Fig. 3 is a plan view of a detail of the indexing apparatus shown in Fig. 1 taken substantially on the line 3—3 thereof; and Fig. 4 illustrates a plan view of the same detail as shown in Fig. 3 with the index parts in an opposite position; and Fig. 5 is a vertical sectional view through the detail of the indexing apparatus shown in Fig. 3, taken substantially on the line 5—5 thereof; and Fig. 6 is a small diagrammatic plan view of the spaced cutting tools with the work shown in several stages of completion therebetween; and Fig. 7 is an elevational view of a rough work piece; and Figs. 8 and 9 are elevational and bottom plan views of the work piece after operating thereon, respectively.

Reference may be had to the drawings, and more particularly in Figs. 1 and 2, there is shown an elevational view and a plan view of a portion of a broaching machine, generally designated 10, adapted to perform a series of related operations upon a work piece thereof. The machine 10 has a base 11 upon which in suitable "ways" a movable table is reciprocated by a ram 14 powered by a gear and toothed rack, not shown, and carries the broaching tool 12. A sub-frame structure 16, mounted intermediate the longitudinal length of the base 11, rises vertically from either side of the top of the movable table. Positioned centrally of the sub-frame 16 and extended vertically therethrough from the upper end, where it is operably connected to a fluid-powered cylinder, not shown, is a reciprocable spindle 20 which has a tapered and splined annular lower work-receiving end adapted to be projected downwardly through a central opening in the table into the area between the spaced cutting teeth of the broach 12.

In order to control feeding and reversal of the cutting tool, and several timed movements of the work feeding and indexing apparatus stops, cam means and bleeder valves actuated thereby are stationed at the necessary positions and the operation and the individual elements are not claimed per se. It will be understood the indexing mechanism or apparatus about to be described is adaptable to various types of machine elements and consists of indexing and locking members having angular cooperating faces thereon to effect positioning of machine parts. Accordingly, the present machine which is used to produce several related broaching operations upon an annular work piece is supplied with one form of indexing apparatus which forms no part of the present invention per se. The said indexing apparatus per se is covered in my copending application, filed on even date herewith, and to which reference may be had for a more detailed explanation thereof.

Having particular reference to Figs. 3, 4 and 5 there is shown an indexing mechanism which comprises in part a centrally apertured support plate 22, that is secured to opposite sides of the upright sub-frame 16, and through which is reciprocally journalled and extended the work spindle 20. Upon the support plate 22 is positioned in suitable "ways" 24 which slidably receive it, a table 25 having mounted thereon indexing and locking members 25a and 25b of predetermined form and disposition to effect the desired indexing and locking of the work spindle 20, as best shown in Fig. 3 or 4. Between the indexing and locking members 25a and 25b is a rotatable and locking member 27, in this case of triangular form to match the angular face of the indexing and locking members 25a and 25b, which is fixed in a manner to rotate spindle 20 to produce the desired indexing effected by said indexing and locking members. In order to effect slidable securement of the block 27 to the spindle 20 in a manner permitting fine adjustment thereof to take all lost motion out of the connection there are shown a plurality of fingers 29, in this case three to match the number of faces on the indexing and locking member 27, which fit into complementary splines in the spindle 20 and which are threaded and locked into the rotatable member 27. The table 25 has a central slotted opening 30 to permit movement thereof without interfering with spindle 20, as shown in Figs. 3 and 4; and, furthermore, a connecting rod 31 is fixed to the table 25 and to a fluid-powered cylinder, not shown, to effect the movement of the indexing and locking members 25a and 25b as shown by the arrows thereon in Figs. 3 and 4.

From the foregoing detailed description of the indexing apparatus it will be apparent that by very obvious variations of the faces 25a—b both as to number and shape, and likewise the co-operating indexing and locking member 27, that any desired equal index steps may be made by shaping the faces of the component parts to form a variety of operations on such machine tools as drilling, broaching, reaming and milling. Since the machine tool has been illustrated in conjunction with a specific index apparatus reference will now be made to its applicability in that field.

A work receiving shoe 35, as best shown in Figs. 1 and 2, which receives a work piece from a hopper 36, is slidably supported in suitable ways in the sub-frame 16 above the base 11 and parallel to the longitudinal axis of the broach 12. A slotted U-shaped end 37 of the shoe 35 is arranged in a retracted position of the shoe, as shown in Fig. 1, to afford reception for the annular shouldered work piece 38, shown in Fig. 7. At the opposite end of the shoe 35 a lever and crank arm 39 pivoted thereto has a roller arranged to be actuated, at suitable timed intervals with respect to the travel of the broaching tool 12, by spaced cam plates 40 secured thereto, for propelling the work receiving shoe. As the broaching tool 12 is retracted an adjustable stop means 41 secured thereto is arranged to contact a pair of slidable rods 42 journalled in a plate 43 secured adjacent the forward or advanced position of the movable work receiving shoe 35, whereby it will be repelled to its original position in line to receive another work piece to repeat the cycle of operation.

As the work receiving shoe 35 is moved forward with the work piece 38 in place, when it arrives under the work receiving spindle 20, which has a tapered serrated lower end, the spindle is forced through a central opening in the annular work piece, and the work removed from the shoe 35 is then moved through a hardened bushing 44 to dispose it in working position between the spaced teeth of broaching tool 12. In order to compensate for the effect of the transverse thrust upon the spindle 20 by the tool acting upon the work secured on the lower end thereof, a stationary thrust-absorbing shoe 45 is positioned between the teeth of the broaching tools 12 and secured to the base 11. After the several related operations are performed upon the work piece to reduce it to the finished form 46, shown in Fig. 8, a stripping means 50, shown in Fig. 1, which admits the rough work piece to the tool automatically closes and upon retraction of the work spindle 20 strips the finished work from the spindle when it then falls into a basket below the machine.

In operation of the machine and indexing apparatus, work fed to the hopper tube means 38 descends to the face of work receiving shoe 35, which, when it is in the retracted position shown in Fig. 1, admits one piece of work to the U-shaped slotted end thereof. The reciprocable work-receiving spindle 20, at this time being in its raised or retracted position, is then actuated by suitable fluid powered means in timed relation to the work piece carried by the work-receiving shoe 35 so as to have the tapered serrated end of the spindle forced through the central opening in the work and be secured rigidly and non-rotatably thereon. The tool 12, in this case cutting teeth of a pair of broaches, has been advancing during the aforementioned positioning operations and now begins the first cutting operation, in the manner shown in the small view in Fig. 6. As best shown in Fig. 2 the tool 12 consists of three sets of parallel broaches with predetermined longitudinal spacing between each set of broaches.

Accordingly, in timed relation to the travel of the tools presenting a blanked space to the work, the work is then automatically indexed by fluid power according to the setting of the indexing and locking means 25—27, previously mentioned, an aliquot portion of a revolution to enable performance of the next related broaching operation thereon. Thereafter the work piece is rotatably indexed a second time and two more sides of the work piece are flatted-off to form a hexagon nut blank as shown in Figs. 7 and 8.

Upon the broaching tools 12 reaching the end of their travel a quick reversing mechanism, not shown, returns the tool to its initial position, at the same time the work spindle 20 is being retracted upwardly to its original position, and the stop means 41 and rods 42 actuate the work receiving shoe 35 to its initial position ready to receive another work piece and repeat the cycle of operation just described. Of course, as the work spindle 20 is moved upwardly, the finished work piece 46 is stripped therefrom by the automatic stripping means 50, previously mentioned.

From the foregoing it will now be apparent there has been disclosed a novel machine tool incorporating an indexing apparatus embodying, among other things, the objects and advantages of the invention first enumerated. It is not intended to be limited, however, in the application of the specific form of indexing apparatus to the concrete example of the broaching machine upon which it was herein described in conjunction, as this was merely for purposes of illustration, and it will now be apparent that many formal modifications will now be suggested to those skilled in this art, whereby it may be adapted to other operations and work pieces as suggested, and the scope of the invention is considered commensurate with the spirit and substance of the following claims.

What I claim is:

1. In a machine tool, in combination, a linearly movable cutting element provided with a pair of opposed and laterally spaced rows of cutting teeth, the teeth of each of said rows being arranged in groups spaced from one another in the direction of movement of said element and the space between adjacent groups of one row being transversely aligned with the space between the groups of teeth of the other of said rows, a work carrying plunger axially reciprocable in a direction perpendicular to the direction of movement of said element and in a path intermediate said rows of teeth on said element, and means cooperating with said plunger for effecting intermittent indexing of the same about its axis.

2. In a machine tool, in combination, a linearly movable cutting element provided with a pair of opposed and laterally spaced rows of cutting teeth, the teeth of each of said rows being arranged in groups spaced from one another in the direction of movement of said element and the space between adjacent groups of one row being transversely aligned with the space between the groups of teeth of the other of said rows, a work carrying plunger axially reciprocable in a direction perpendicular to the direction of movement of said element and in a path intermediate said rows of teeth on said element, an abutment engageable with an end of said plunger when the latter is in a position to present work carried thereby for engagement by said teeth and in a position to resist the force of the cutting action of said teeth on the work transmitted to said plunger, and means cooperating with said plunger for effecting intermittent indexing of the same about its axis.

3. In a machine tool, in combination, a linearly movable cutting element provided with a pair of opposed and laterally spaced rows of cutting teeth, the teeth of each of said rows being arranged in groups spaced from one another in the direction of movement of said element and the space between adjacent groups of one row being transversely aligned with the space between the groups of teeth of the other of said rows, a work carrying plunger axially reciprocable in a direction perpendicular to the direction of movement of said element and in a path intermediate said rows of teeth on said element, an abutment engageable with an end of said plunger when the latter is in a position to present work carried thereby for engagement by said teeth and in a position to resist the force of the cutting action of said teeth on the work transmitted to said plunger, means for presenting a piece of work for engagement by said plunger, and means cooperating with said plunger for effecting intermittent indexing of the same about its axis.

JAMES J. DOSTAL.